United States Patent
Huang et al.

(10) Patent No.: US 12,448,962 B2
(45) Date of Patent: Oct. 21, 2025

(54) VOLTAGE REGULATION AND SPEED REGULATION CONTROL CIRCUIT OF AN AIR PUMP

(71) Applicant: Intex Marketing Ltd., Tortola (VG)

(72) Inventors: Zhi Xiong Huang, Fujian (CN); Ying Biao Zhang, Fujian (CN)

(73) Assignee: Intex Marketing Ltd., Tortola (VG)

( * ) Notice: Subject to any disclaimer, the term of this patent is extended or adjusted under 35 U.S.C. 154(b) by 208 days.

(21) Appl. No.: 18/265,942

(22) PCT Filed: Dec. 8, 2021

(86) PCT No.: PCT/IB2021/061466
§ 371 (c)(1),
(2) Date: Jun. 7, 2023

(87) PCT Pub. No.: WO2022/123461
PCT Pub. Date: Jun. 16, 2022

(65) Prior Publication Data
US 2024/0052825 A1    Feb. 15, 2024

(30) Foreign Application Priority Data
Dec. 9, 2020  (CN) .......................... 202022977064.0

(51) Int. Cl.
*H02P 7/28*    (2016.01)
*F04B 49/06*   (2006.01)
(Continued)

(52) U.S. Cl.
CPC ............. *F04B 49/06* (2013.01); *H02H 7/085* (2013.01); *H02P 7/292* (2013.01); *F04B 35/04* (2013.01)

(58) Field of Classification Search
CPC ..... F04D 29/503; F04D 27/004; H02H 7/085; H02P 7/292; H02P 7/28; F04B 49/06; F04B 35/04; Y02B 30/70
(Continued)

(56) References Cited

U.S. PATENT DOCUMENTS 4,527,947 A * 7/1985 Elliott ..................... F04D 7/045
                                                        415/121.2
4,890,344 A * 1/1990 Walker ................... A47C 27/10
                                                        251/129.05
(Continued)

FOREIGN PATENT DOCUMENTS

JP          3120866         12/2000

OTHER PUBLICATIONS

Electrical Equipment Circuit; Jessie (Year: 2011).*
(Continued)

*Primary Examiner* — Gabriel Agared
(74) *Attorney, Agent, or Firm* — Faegre Drinker Biddle & Reath LLP

(57) ABSTRACT

A voltage regulation and speed regulation control circuit (100, 130, 200, 250) of an air pump (102) is provided. The voltage regulation and speed regulation control circuit (100, 130, 200, 250) may comprise a chopper power supply circuit (104, 202), a full bridge rectifier circuit (106, 204) and a switch (108, 212). The switch (108, 212) may be used to switch the chopper power supply circuit (104, 202) or the full bridge rectifier circuit (106, 204) to be connected to the positive and negative input terminals (103, 105) of the air pump (102). The output voltage of the chopper power supply circuit (104, 202) and the output voltage of the full bridge rectifier circuit may be different (106, 204).

14 Claims, 2 Drawing Sheets

(51) Int. Cl.
*H02H 7/085* (2006.01)
*H02P 7/292* (2016.01)
*F04B 35/04* (2006.01)

(58) Field of Classification Search
USPC ..................................................... 318/400.2
See application file for complete search history.

(56) References Cited

U.S. PATENT DOCUMENTS

| | | | |
|---|---|---|---|
| 4,993,920 A | 2/1991 | Harkleroad | |
| 6,216,474 B1* | 4/2001 | Sishtla | F25B 1/047 62/84 |
| 11,162,496 B2* | 11/2021 | Mayleben | F04D 29/5813 |
| 2007/0189905 A1* | 8/2007 | Dinsdale | F04D 17/12 417/2 |
| 2011/0280740 A1* | 11/2011 | Birchette | F04B 39/0215 417/53 |
| 2020/0072223 A1* | 3/2020 | Blad | F04D 15/0022 |
| 2021/0244194 A1* | 8/2021 | Adams | A47C 27/18 |

OTHER PUBLICATIONS

International Search Report and Written Opinion as issued by the International Searching Authority, dated Feb. 22, 2022, for International Patent Application No. PCT/IB2021/061466; 10 pages.
Anonymous, "POKO TD-169C Hair dryer circuit diagram-Electrical_Equipment_Circuit-Circuit Diagram-SeekIC.com", Jan. 15, 2012; 1 page.

* cited by examiner

VOLTAGE REGULATION AND SPEED REGULATION CONTROL CIRCUIT OF AN AIR PUMP

RELATED APPLICATIONS

This The present application is a national stage entry of International (PCT) Patent Application Number PCT/IB2021/061466, filed Dec. 8, 2021, which claims priority to Chinese Application No. CN202022977064.0, filed Dec. 9, 2020, the entire disclosures of which are expressly incorporated by reference herein.

TECHNICAL FIELD

The present disclosure relates to an air pump, in particular to a control circuit of the air pump.

BACKGROUND

The air pump is a key component of various inflatable products (such as inflatable mattresses, inflatable trampolines, inflatable sofas and large inflatable toys). The air pump is installed on the inner side of the flexible bag of the inflatable product. The air pump can be used to perform rapid inflation, pressure retention, and rapid deflation of the inflatable product, so as to realize the inflation and expansion of the inflatable product for normal use and deflation to reduce the space volume to facilitate collection and other functions.

The core of the air pump is the motor, and the core of the motor is its power control circuit. Therefore, the quality of the control circuit directly affects the performance of the final air pump. Existing air pumps generally use AC series-excited motors to produce electric dual-purpose air pumps and electric air pumps, etc., and the pressure and flow rate of the air pump need to be adjusted for different situations. The existing control circuits are relatively complicated and not easy to implement.

SUMMARY

In an exemplary embodiment of the present disclosure, a voltage regulation and speed regulation control circuit of an air pump having a positive input terminal and a negative input terminal is provided. The voltage regulation and speed regulation control circuit comprising: a chopper power supply circuit operatively couplable to the air pump; a full bridge rectifier circuit operatively couplable to the air pump; and a switch operatively couplable to the chopper power supply circuit and operatively couplable to the full bridge rectifier. The switch has a first contact wherein the chopper power supply circuit is to be connected to the positive and negative input terminals of the air pump and a second contact wherein the full bridge rectifier circuit is to be connected to the positive and negative input terminals of the air pump. The chopper power supply circuit having a first output voltage when connected to the air pump and the full bridge rectifier circuit having a second output voltage when connected to the air pump. The first output voltage being different than the second output voltage.

In an example thereof, the switch is arranged on a live line. The chopper power supply circuit including one of a diode or a thyristor. The first contact of the switch is connected to one end of the diode or the thyristor of the chopper power supply circuit and the second contact of the switch is connected to an input end of the full bridge rectifier circuit. The other end of the diode or the thyristor of the chopper power supply circuit is connected to the input end of the full bridge rectifier circuit.

In another example thereof, the chopper power supply circuit includes the diode. A cathode of the diode of the chopper power supply circuit is connected to the second contact of the switch and to the input end of the full bridge rectifier circuit through a thermal protection module.

In a further example thereof, the chopper power supply circuit includes the diode. A cathode of the diode of the chopper power supply circuit and the second contact of the switch are connected to the input end of the full bridge rectifier circuit through a first thermal protection module and a second thermal protection module, respectively.

In a further yet example, the chopper power supply circuit and the full bridge rectifier circuit consume one zero line.

In still another example, the chopper power supply circuit and the full bridge rectifier circuit each have a respective live line. The first contact of the switch is connected to the live line of the chopper power supply circuit. The second contact of the switch is connected to the positive output end of the full bridge rectifier circuit. A common contact of the switch is connected to the positive input terminal of the air pump.

In yet still another example, each of the live line of the chopper power supply circuit and the live line of the full bridge rectifier circuit include a respective thermal protection module.

In a further still example, the live line of the chopper power supply circuit and the live line of the full bridge rectifier circuit include a common thermal protection module.

In another exemplary embodiment of the present disclosure, an inflatable product having an air pump and including any of the disclosed voltage regulation and speed regulation control circuit is provided.

An exemplary problem addressed by the present disclosure is to provide a voltage regulation and speed regulation control circuit of an air pump, which has a simple structure and is easy to realize.

In embodiments, a voltage regulation and speed regulation control circuit of an air pump is provided which comprises: a chopper power supply circuit, a full bridge rectifier circuit, and a switch.

The switch may be used to switch the chopper power supply circuit or the full bridge rectifier circuit to be connected to the positive and negative input terminals of the air pump.

The output voltage of the chopper power supply circuit and the output voltage of the full bridge rectifier circuit may be different.

In embodiments, the switch is arranged on the live line, the first contact is connected to one end of the diode or thyristor of the chopper power supply circuit, the second contact is connected to the input end of the full bridge rectifier circuit, and the other end of the diode or the thyristor is connected to the input end of the full bridge rectifier circuit.

In embodiments, the cathode of the diode is connected to the second contact and then connected to the input end of the full bridge rectifier circuit through a thermal protection module.

In embodiments, the cathode and the second contact of the diode are respectively connected to the input end of the full bridge rectifier circuit through a thermal protection module.

In embodiments, the chopper power supply circuit and the full bridge rectifier circuit consume one zero line.

In embodiments, the chopper power supply circuit and the full bridge rectifier circuit each have a live line; the first contact of the switch is connected to the live line of the chopper power supply circuit, the second contact is connected to the positive output end of the full bridge rectifier circuit, and the common contact is connected to the positive pole of the air pump.

In embodiments, the live line of the chopper power supply circuit and the full bridge rectifier circuit are respectively provided with a thermal protection module.

In embodiments, the live line of the chopper power supply circuit and the full bridge rectifier circuit consume one thermal protection module.

An advantage, among others, of exemplary embodiments is the provision of a voltage regulation and speed regulation control circuit of an air pump that the air pump can be connected to a chopper power supply circuit or a full bridge rectifier circuit through a switch, thereby realizing the pressure and speed regulation of the air pump.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
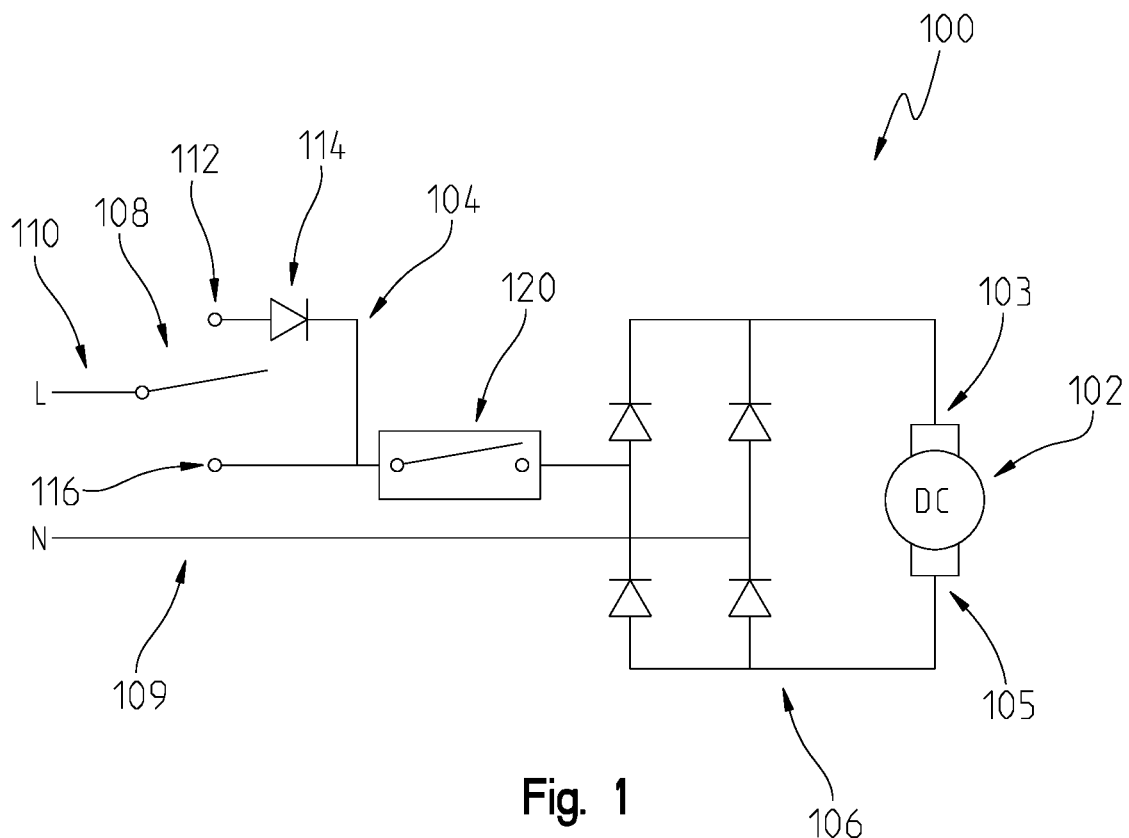
FIG. 1 is a circuit diagram of the preferred embodiment 1 of the present invention.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE EMBODIMENTS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

In the description of the present disclosure, it should be noted that the terms upper, lower, inner, outer, top/bottom, etc. indicating the orientation or positional relationship based on the orientation shown in the drawings are only for the convenience of describing the present invention and simplifying the description, rather than indicating or implying that the pointed device or element must have a specific orientation, be constructed and operated in a specific orientation, and therefore cannot be understood as a limitation of the present invention. In addition, the terms first and second are only used for descriptive purposes, and cannot be understood as indicating or implying relative importance.

In the description of the present disclosure, it should be noted that the terms installed, provided with, socketed/connected, connected, etc., should be understood broadly, connection can be wall-mounted connection, detachable connection, or integral connection, mechanical connection or electrical connection, direct connection, or indirect connection through an intermediate medium, and it can be inside two components.

Embodiment 1

Referring to FIG. 1, this embodiment provides a voltage regulation and speed regulation control circuit 100 of an air pump 102, which comprises a chopper power supply circuit 104, a full bridge rectifier circuit 106, and a switch 108.

The switch 108 is used to switch the chopper power supply circuit 104 or the full bridge rectifier circuit 106 to be connected to the positive and negative input terminals of the air pump 102. The user can switch the air pump 102 to connect with the chopper power supply circuit 104 or the full bridge rectifier circuit 106 through the switch 108, so as to realize the pressure and speed regulation of the air pump 102.

In this embodiment, the switch 108 is arranged on the live line 110, and its first contact 112 is connected to the anode of the diode 114 of the chopper power supply circuit 104, and the second contact 116 is connected to the input end of the full bridge rectifier circuit 106; the cathode of the diode 114 is connected to the input end of the full bridge rectifier circuit.

In the illustrated embodiment, the cathode of the diode 114 is connected to the second contact 116 and is then connected to the input end of the full bridge rectifier circuit 106 through a thermal protection module 120. In this way, the chopper power supply circuit 104 and the full bridge rectifier circuit 106 share a thermal protection module 120.

In this embodiment, a diode 114 is provided on the chopper power supply circuit 104. By using the characteristic that the diode 114 is turned on in the positive half of the cycle and is cut of in the negative half of the cycle, the output voltage of the chopper power supply circuit 104 can be half of the AC voltage. If the diode 114 is replaced with a thyristor, the conduction angle of the thyristor can be adjusted to achieve stepless adjustment within the voltage range of 0-100%.

Embodiment 2

Figure 2:
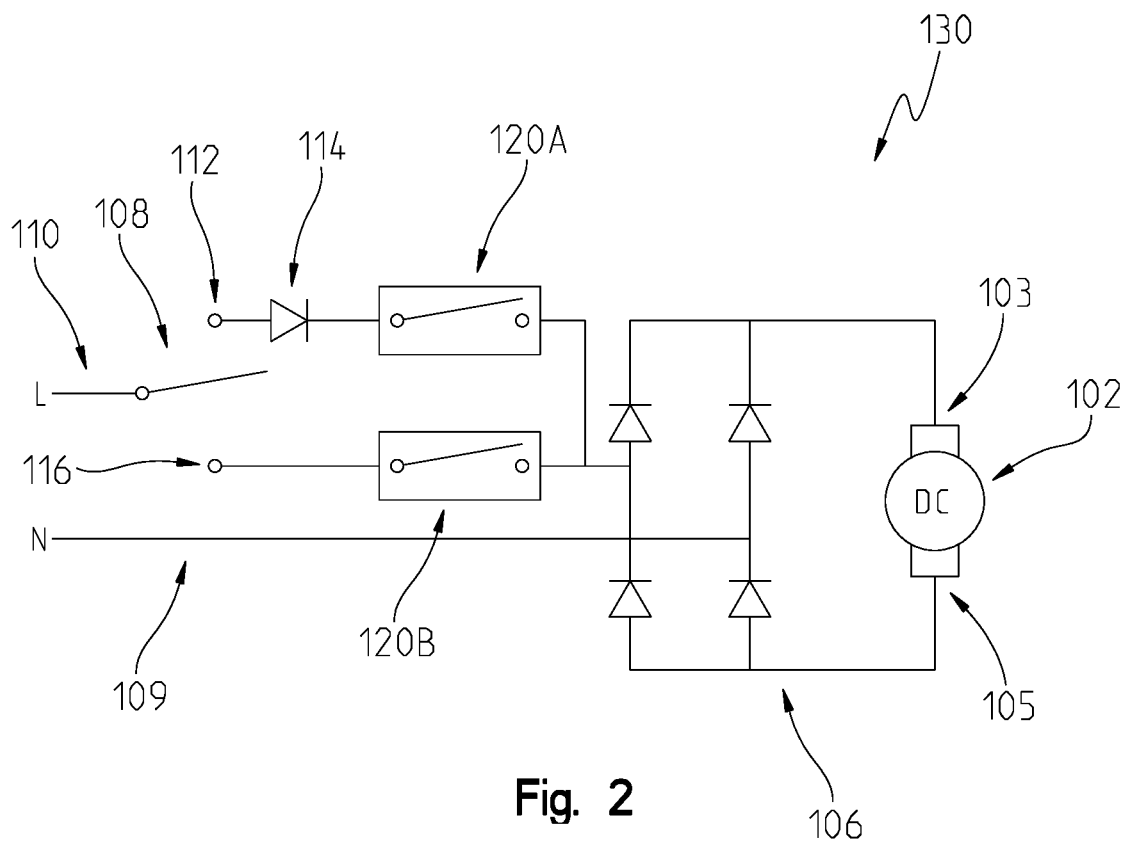
FIG. 2 is a circuit diagram of the preferred embodiment 2 of the present invention.

Referring to FIG. 2, in this embodiment of a voltage regulation and speed regulation control circuit 130, the cathode of the diode 114 and the second contact 116 of the switch 108 are respectively connected to the input end of the full bridge rectifier circuit 106 through a thermal protection module 120A, 120B. The rest is the same as in Embodiment 1, and will not be repeated.

Embodiment 3

Figure 3:
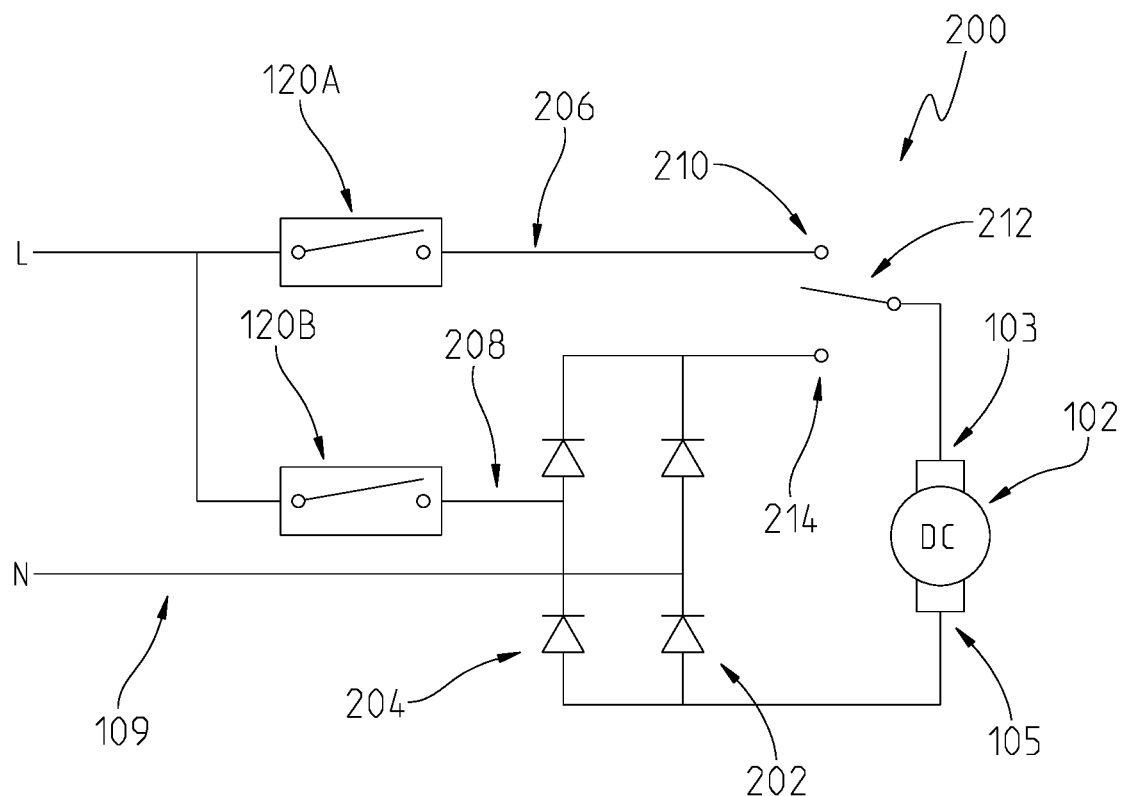
FIG. 3 is a circuit diagram of the preferred embodiment 3 of the present invention.

Referring to FIG. 3, in this embodiment of a voltage regulation and speed regulation control circuit 200, the chopper power supply circuit 202 and the full bridge rectifier circuit 204 consume one zero line 109. In addition, the chopper power supply circuit 202 and the full bridge rectifier circuit 204 each have a live line 206, 208, respectively; the first contact 210 of the switch 212 is connected to the live line 206 of the chopper power supply circuit 202, and the second contact 214 of the switch 212 is connected to the positive output end of the full bridge rectifier circuit 204, the common contact is connected to the positive pole of the air pump 102. Such a structure 200 may still realize the switching between the chopper power supply circuit 202 and the full bridge rectifier circuit 204 through the switch 212, and saves a diode or thyristor over the embodiment shown in FIG. 2.

In this embodiment, the live lines 206, 208 of the chopper power supply circuit 202 and the full bridge rectifier circuit 204 are respectively provided with a thermal protection module 120A, 120B.

Embodiment 4

Figure 4:
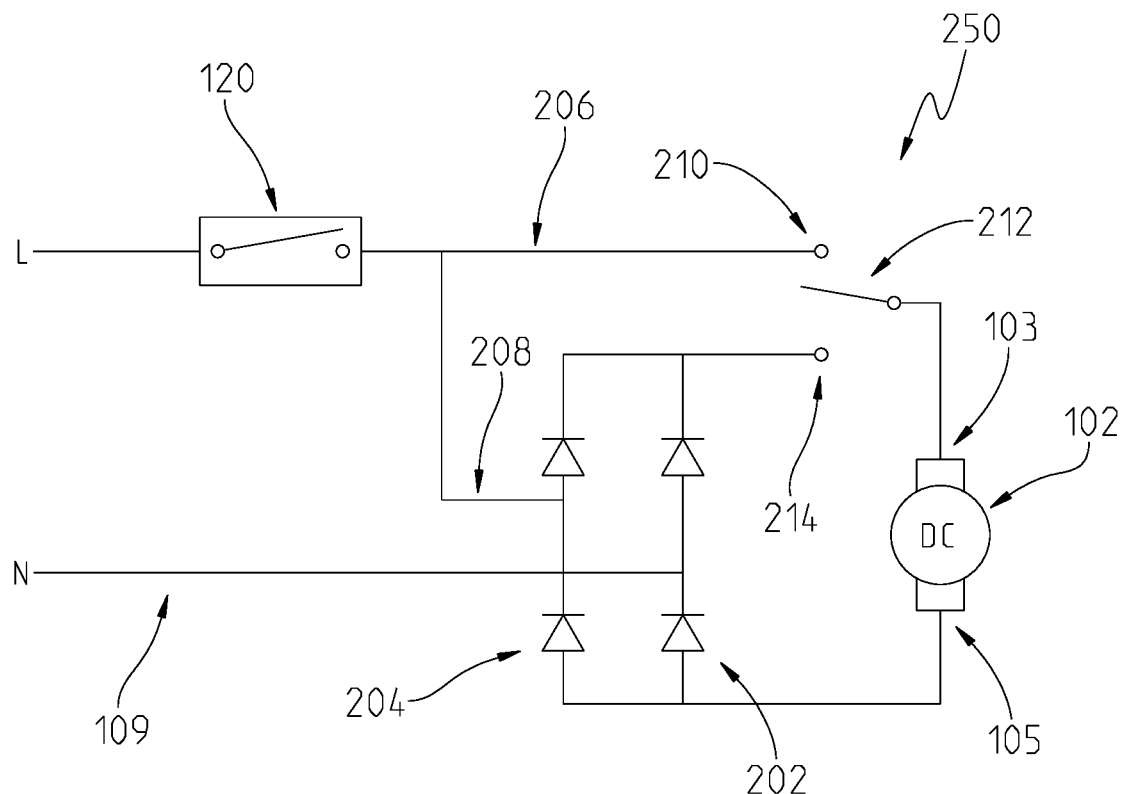
FIG. 4 is a circuit diagram of the preferred embodiment 4 of the present invention.

Referring to FIG. 4, in this embodiment of a voltage regulation and speed regulation control circuit 250, the live line of the chopper power supply circuit and the full bridge rectifier circuit consume a common thermal protection module 120. The rest is the same as in Embodiment 3, and will not be further described.

In exemplary embodiments of the present disclosure, a voltage regulation and speed regulation control circuit 100, 130, 200, 250 of an air pump 102 having a positive input terminal 103 and a negative input terminal 105. The voltage regulation and speed regulation control circuit 100, 130, 200, 250 comprising: a chopper power supply circuit 104, 202 operatively couplable to the air pump 102; a full bridge rectifier circuit 106, 204 operatively couplable to the air pump 102; and a switch 108, 212 operatively couplable to the chopper power supply circuit 104, 202 and operatively couplable to the full bridge rectifier 106, 204. The switch 108, 212 has a first contact 112, 210 wherein the chopper power supply circuit 104, 202 is to be connected to the positive and negative input terminals 103, 105 of the air pump 102 and a second contact 116, 214 wherein the full bridge rectifier circuit 106, 204 is to be connected to the positive and negative input terminals 103, 105 of the air pump 102. The chopper power supply circuit 104, 202 having a first output voltage when connected to the air pump 102 and the full bridge rectifier circuit 106, 204 having a second output voltage when connected to the air pump 102. The first output voltage being different than the second output voltage. The first output voltage being different than the second output voltage in response to the same input voltage on the live line.

In examples, the switch 108 is arranged on a live line 110. The chopper power supply circuit 104 including one of a diode 114 or a thyristor. The first contact 112 of the switch 108 is connected to one end of the diode 114 or the thyristor of the chopper power supply circuit 104 and the second contact 116 of the switch 108 is connected to an input end of the full bridge rectifier circuit 106. The other end of the diode 114 or the thyristor of the chopper power supply circuit 104 is connected to the input end of the full bridge rectifier circuit 106.

In examples, the chopper power supply circuit 104 includes the diode 114. A cathode of the diode 114 of the chopper power supply circuit 104 is connected to the second contact 116 of the switch 108 and to the input end of the full bridge rectifier circuit 106 through a thermal protection module 120.

In examples, the chopper power supply circuit 104 includes the diode 114. A cathode of the diode 114 of the chopper power supply circuit 104 and the second contact 116 of the switch 108 are connected to the input end of the full bridge rectifier circuit 106 through a first thermal protection module 120A and a second thermal protection module 120B, respectively.

In examples, the chopper power supply circuit 104, 202 and the full bridge rectifier circuit 106, 204 consume one zero line 109.

In examples, the chopper power supply circuit 202 and the full bridge rectifier circuit 204 each have a respective live line 206, 208. The first contact 210 of the switch 212 is connected to the live line 206 of the chopper power supply circuit 202. The second contact 214 of the switch 212 is connected to the positive output end of the full bridge rectifier circuit 204. A common contact 213 of the switch 212 is connected to the positive input terminal 103 of the air pump 102.

In examples, each of the live line 206 of the chopper power supply circuit 202 and the live line 208 of the full bridge rectifier circuit 204 include a respective thermal protection module 120A, 120B.

In examples, the live line 206 of the chopper power supply circuit 202 and the live line 208 of the full bridge rectifier circuit 204 include a common thermal protection module 120.

In exemplary embodiments, an inflatable product having an air pump 102 and including any of the disclosed voltage regulation and speed regulation control circuit 100, 130, 200, 250 is provided. In examples, the inflatable product being one of an inflatable mattress, an inflatable pool, an inflatable spa, an inflatable trampoline, an inflatable sofa, and an inflatable toy. Exemplary inflatable products are disclosed in U.S. Pat. Nos. 5,813,946; 6,565,405; 6,671,910; 9,468,582; 10,165,869; the entire disclosures of which are expressly incorporated by reference herein.

Additional switches may be incorporated into the various voltage regulation and speed regulation control circuit 100, 130, 200, 250 which connect the negative terminal 105 of air pump 102 to the positive outputs of the respective chopper power supply circuit 104, 202 and the respective full bridge rectifier circuits 106, 204; in essence running air pump 102 in reverse for deflation.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A voltage regulation and speed regulation control circuit of an air pump having a positive input terminal and a negative input terminal, comprising:
 a chopper power supply circuit operatively couplable to the air pump;

a full bridge rectifier circuit operatively couplable to the air pump; and a switch operatively couplable to the chopper power supply circuit and operatively couplable to the full bridge rectifier, wherein the switch has a first contact wherein the chopper power supply circuit is to be connected to the positive and negative input terminals of the air pump and a second contact wherein the full bridge rectifier circuit is to be connected to the positive and negative input terminals of the air pump, the chopper power supply circuit having a first output voltage when connected to the air pump and the full bridge rectifier circuit having a second output voltage when connected to the air pump, the first output voltage being different than the second output voltage, and a thermal protection module positioned on a live line of the voltage regulation and speed regulation control circuit, the live line operatively coupled to the positive input terminal and operatively couplable to the switch.

2. The voltage regulation and speed regulation control circuit according to claim 1, wherein the switch is arranged on the live line, the chopper power supply circuit including one of a diode or a thyristor, the first contact of the switch is connected to one end of the diode or the thyristor of the chopper power supply circuit and the second contact of the switch is connected to an input end of the full bridge rectifier circuit;

the other end of the diode or the thyristor of the chopper power supply circuit is connected to the input end of the full bridge rectifier circuit.

3. The voltage regulation and speed regulation control circuit according to claim 2, wherein the chopper power supply circuit includes the diode, a cathode of the diode of the chopper power supply circuit is connected to the second contact of the switch and to the input end of the full bridge rectifier circuit through the thermal protection module.

4. The voltage regulation and speed regulation control circuit according to claim 2, wherein the chopper power supply circuit includes the diode, a cathode of the diode of the chopper power supply circuit and the second contact of the switch are connected to the input end of the full bridge rectifier circuit through a first thermal protection module and a second thermal protection module, respectively.

5. The voltage regulation and speed regulation control circuit according to claim 1, wherein the chopper power supply circuit and the full bridge rectifier circuit are connected to one zero line.

6. The voltage regulation and speed regulation control circuit according to claim 5, wherein the chopper power supply circuit and the full bridge rectifier circuit each have a respective live line; the first contact of the switch is connected to the live line of the chopper power supply circuit, the second contact of the switch is connected to the positive output end of the full bridge rectifier circuit, and a common contact of the switch is connected to the positive input terminal of the air pump.

7. The voltage regulation and speed regulation control circuit according to claim 6, wherein each of the live line of the chopper power supply circuit and the live line of the full bridge rectifier circuit include a respective thermal protection module.

8. The voltage regulation and speed regulation control circuit according to claim 6, wherein the live line of the chopper power supply circuit and the live line of the full bridge rectifier circuit include the common thermal protection module.

9. An inflatable product having an air pump and including the voltage regulation and speed regulation control circuit according to claim 1.

10. The inflatable product of claim 9, wherein the inflatable product is an inflatable mattress, an inflatable trampoline, an inflatable sofa, or an inflatable toy.

11. A voltage regulation and speed regulation control circuit of an air pump having a positive input terminal and a negative input terminal, comprising:

a chopper power supply circuit operatively couplable to the air pump;

a full bridge rectifier circuit operatively couplable to the air pump;

a switch operatively couplable to the chopper power supply circuit and operatively couplable to the full bridge rectifier, wherein the switch has a first contact wherein the chopper power supply circuit is to be connected to the positive and negative input terminals of the air pump and a second contact wherein the full bridge rectifier circuit is to be connected to the positive and negative input terminals of the air pump, the chopper power supply circuit having a first output voltage when connected to the air pump and the full bridge rectifier circuit having a second output voltage when connected to the air pump, the first output voltage being different than the second output voltage, wherein the switch is arranged on a live line, the chopper power supply circuit including one of a diode or a thyristor, the first contact of the switch is connected to one end of the diode or the thyristor of the chopper power supply circuit and the second contact of the switch is connected to an input end of the full bridge rectifier circuit; the other end of the diode or the thyristor of the chopper power supply circuit is connected to the input end of the full bridge rectifier circuit, wherein the chopper power supply circuit includes the diode, a cathode of the diode of the chopper power supply circuit and the second contact of the switch are connected to the input end of the full bridge rectifier circuit through a first thermal protection module and a second thermal protection module, respectively.

12. A voltage regulation and speed regulation control circuit of an air pump having a positive input terminal and a negative input terminal, comprising:

a chopper power supply circuit operatively couplable to the air pump;

a full bridge rectifier circuit operatively couplable to the air pump; and a switch operatively couplable to the chopper power supply circuit and operatively couplable to the full bridge rectifier, wherein the switch has a first contact wherein the chopper power supply circuit is to be connected to the positive and negative input terminals of the air pump and a second contact wherein the full bridge rectifier circuit is to be connected to the positive and negative input terminals of the air pump, the chopper power supply circuit having a first output voltage when connected to the air pump and the full bridge rectifier circuit having a second output voltage when connected to the air pump, the first output voltage being different than the second output voltage, wherein the chopper power supply circuit and the full bridge rectifier circuit consume are connected to one zero line;

wherein each of a live line of the chopper power supply circuit and a live line of the full bridge rectifier circuit include a respective thermal protection module.

13. The voltage regulation and speed regulation control circuit according to claim 12, wherein the first contact of the switch is connected to the live line of the chopper power supply circuit, the second contact of the switch is connected to the positive output end of the full bridge rectifier circuit, and a common contact of the switch is connected to the positive input terminal of the air pump.

14. The voltage regulation and speed regulation control circuit according to claim 13, wherein the live line of the chopper power supply circuit and the live line of the full bridge rectifier circuit include a common thermal protection module (120).

* * * * *